(12) United States Patent
Mintz et al.

(10) Patent No.: US 10,970,723 B2
(45) Date of Patent: Apr. 6, 2021

(54) COMPUTER-IMPLEMENTED SYSTEM AND METHODS FOR PROVIDING SALES INFORMATION TO SALES PROFESSIONALS

(71) Applicant: DealCoachPro, Inc., Delray Beach, FL (US)

(72) Inventors: Erik Mintz, Delray Beach, FL (US); Joe Hennessey, Ocean Ridge, FL (US); Joe Simone, Lake Worth, FL (US); Lindes Roets, Lake Worth, FL (US); Paristoh Patel, Parkland, FL (US); Jason Reed, Sarasota, FL (US); Bill Golder, Ada, MI (US)

(73) Assignee: DealCoachPro, Inc., Delray Beach, FL (US)

( * ) Notice: Subject to any disclaimer, the term of this patent is extended or adjusted under 35 U.S.C. 154(b) by 531 days.

(21) Appl. No.: 15/381,790

(22) Filed: Dec. 16, 2016

(65) Prior Publication Data

US 2017/0270540 A1 Sep. 21, 2017

Related U.S. Application Data

(60) Provisional application No. 62/310,686, filed on Mar. 19, 2016.

(51) Int. Cl.
*G06Q 10/00* (2012.01)
*G06Q 30/02* (2012.01)

(52) U.S. Cl.
CPC ................................ *G06Q 30/0201* (2013.01)

(58) Field of Classification Search
None
See application file for complete search history.

(56) References Cited

U.S. PATENT DOCUMENTS

| | | | |
|---|---|---|---|
| 2007/0204308 A1* | 8/2007 | Nicholas | H04N 21/222 725/86 |
| 2008/0095339 A1* | 4/2008 | Elliott | H04L 63/083 379/93.01 |

(Continued)

OTHER PUBLICATIONS

Friel, Susan, Making Sense of Graphs: Critical Factors Influencing Comprehension and Instructional Implications, Mar. 2001, National Council of Teachers of Mathematics, http://vis.arc.vt.edu/~npolys/projects/safas/749671.pdf, p. 1-12.*

*Primary Examiner* — Joseph M Waesco
(74) *Attorney, Agent, or Firm* — Jon Gibbins; Fleit Intellectual Property Law

(57) ABSTRACT

In some embodiments, a computer implemented method for determining and generating an electronic recommendation and/or other outputs, such as observations and tasks, in which the method may include the steps of: receiving input from the user through a client device in which the input may include data for populating a key player data record; identifying, via a computing device processor, a first rule corresponding to the key player data record; retrieving, via a computing device processor, a first observation in which the first observation is associated with the first rule; and displaying to the user, via a display screen of the client device, the first observation. In further embodiments of the method, an observation may be associated with a recommendation and the recommendation may include a pre-recorded video multimedia file specific for the observation.

20 Claims, 11 Drawing Sheets

(56) References Cited

U.S. PATENT DOCUMENTS

| | | | | |
|---|---|---|---|---|
| 2008/0126476 A1* | 5/2008 | Nicholas | G06Q 10/10 | |
| | | | 709/203 | |
| 2011/0106743 A1* | 5/2011 | Duchon | G06F 16/35 | |
| | | | 706/46 | |
| 2011/0251868 A1* | 10/2011 | Mikurak | G06Q 30/0202 | |
| | | | 705/7.25 | |
| 2012/0124073 A1* | 5/2012 | Gross | G06F 16/954 | |
| | | | 707/767 | |
| 2012/0185544 A1* | 7/2012 | Chang | G06F 16/2465 | |
| | | | 709/206 | |
| 2012/0233258 A1* | 9/2012 | Vijayaraghavan | G06Q 30/02 | |
| | | | 709/204 | |
| 2013/0204658 A1* | 8/2013 | Yogev | G06Q 30/0201 | |
| | | | 705/7.29 | |
| 2014/0222610 A1* | 8/2014 | Mikurak | G06Q 30/0633 | |
| | | | 705/26.5 | |
| 2015/0073929 A1* | 3/2015 | Psota | G06Q 30/0241 | |
| | | | 705/26.2 | |
| 2015/0112755 A1* | 4/2015 | Potdar | G06Q 30/0201 | |
| | | | 705/7.29 | |
| 2015/0112756 A1* | 4/2015 | Subramanian | G06Q 30/0201 | |
| | | | 705/7.29 | |
| 2015/0112764 A1* | 4/2015 | Augustine | G06Q 30/0202 | |
| | | | 705/7.31 | |
| 2015/0112893 A1* | 4/2015 | Subramanian | G06Q 10/0639 | |
| | | | 706/11 | |
| 2016/0050447 A1* | 2/2016 | Nicholas | H04N 21/25891 | |
| | | | 725/14 | |
| 2016/0253710 A1* | 9/2016 | Publicover | H04N 21/4532 | |
| | | | 705/14.66 | |

* cited by examiner

231 →

Name: Bob Brown
Job Title: CEO

Role: Decision Maker
235 — Impact Score: 6
236 — Priority Score: 2
237 — Access Score: 2
238 — Advocacy Score: 1

231 →

Name: Susie Smith
Job Title: Director of IT

Role: Decision Influencer
235 — Impact Score: 5
236 — Priority Score: 8
237 — Access Score: 8
238 — Advocacy Score: 7

COMPUTER-IMPLEMENTED SYSTEM AND METHODS FOR PROVIDING SALES INFORMATION TO SALES PROFESSIONALS

CROSS REFERENCE TO RELATED APPLICATIONS

This application claims priority to and the benefit of the filing date of U.S. Provisional Application No. 62/310,686 filed on Mar. 19, 2016, entitled "SYSTEMS AND METHODS FOR ASSISTING SALES PROFESSIONALS IN OPTIMIZING THEIR SALES RESULTS", which is hereby incorporated by reference in its entirety.

FIELD OF THE INVENTION

This patent specification relates to the field of providing sales information to sales professionals. More specifically, this patent specification relates to systems and methods that are configured to provide sales information, such as sales methodology, sales training, and sales optimization, to one or more sales professionals.

BACKGROUND

Business-to-business (B2B) Sales Professionals are facing unprecedented pressure to perform—they are expected to sell more—and faster. But to be successful in today's environment, they must overcome many obstacles. A first obstacle needed to be overcome by B2B Sales Professionals is that they are underserved by technology. Tools like Customer Relationship Management (CRM) systems can result in adding an administrative burden more than they help the sales team. They are often instituted for the benefit of the company, not necessarily for that of the salesperson using them.

Another obstacle needed to be overcome by B2B Sales Professionals is that they lack the skills and resources to navigate an increasingly complex buyer landscape. With access to a wealth of information from search engines and social media, today's buyers no longer rely on salespeople for the educational component of their analysis. This means that salespeople have far less time to nurture leads through the sales process.

A further obstacle needed to be overcome by B2B Sales Professionals is that research now shows that, on average, at least 5 people are required to formally sign off on a B2B purchase. The authority to make a purchase now rests within a larger group, most of who are at different stages of the buying journey.

Still another obstacle needed to be overcome by B2B Sales Professionals is that the classroom sales training they typically receive is ineffective, expensive, and outdated. Traditional sales education techniques that were a mainstay for decades now fall short in preparing B2B sales professionals to better align themselves with today's savvy buyers.

The confluence of these factors and obstacles faced by B2B Sales Professionals has created a longer and more complex sales cycle. To solve these problems, there are a number of patents directed at sales methodologies, sales training, and sales optimization. While there have been a number of technologies and systems for facilitating sales, none have provided a simple methodology for overcoming the above mentioned obstacles.

Therefore, a long-standing need exists for simple, yet modern, sales methodologies to help Sales Professionals, such as B2B Sales Professionals, optimize their chances of winning more deals. A further need exists for novel computer-implemented systems and methods that are configured to provide sales information to sales professionals. Finally, a need exists for novel computer-implemented systems and methods that are configured to provide sales information, such as sales methodology, sales training, and sales optimization, to one or more sales professionals.

BRIEF SUMMARY OF THE INVENTION

According to one embodiment consistent with the principles of the invention, a computer implemented method for determining and generating an electronic recommendation is provided. In some embodiments, the method may include the steps of: receiving input from the user through a client device in which the input may include data for populating a key player data record; identifying, via a computing device processor, a first rule corresponding to the key player data record; retrieving, via a computing device processor, a first observation in which the first observation is associated with the first rule; and displaying to the user, via a display screen of the client device, the first observation.

According to another embodiment, the method may include the steps of: receiving input from the user through a client device in which the input includes data for populating a deal data record; identifying, via a computing device processor, a second rule corresponding to the deal data record; retrieving, via a computing device processor, a second recommendation wherein the second recommendation is associated with the second rule; and displaying to the user, via a display screen of the client device, the second recommendation.

In still further embodiments, an observation may be associated with a recommendation and the recommendation may include a pre-recorded video multimedia file specific for the observation.

According to another embodiment consistent with the principles of the invention, a computer implemented system for determining and generating an electronic recommendation is provided. In some embodiments, the system may include: a client device having a display screen and an input interface for receiving input from a user; a computing platform having a processor, a memory in communication with the processor, and input logic stored in the memory, executable by the processor and configured to receive input from the user in which the input includes data for populating a key player data record stored in the memory; identification logic stored in the memory, executable by the processor and configured to identify a first rule corresponding to the key player data record; retrieval logic stored in the memory, executable by the processor and configured to retrieve a first recommendation in which the first recommendation is associated with the rule; and display logic stored in the memory, executable by the processor and configured to display to the user, via a display screen of the client device, the first recommendation.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

Figure 1:
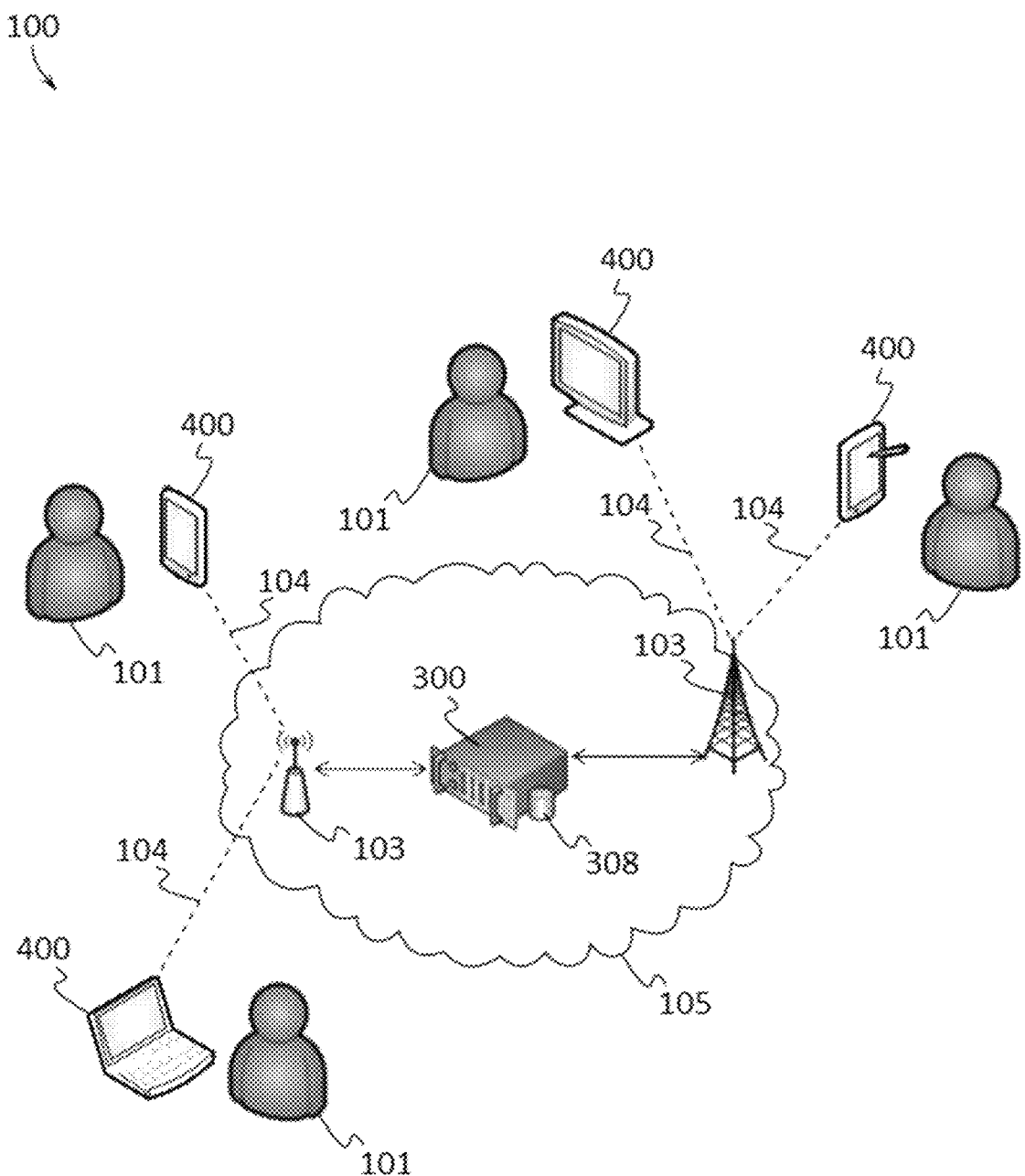
FIG. 1 depicts an illustrative example of some of the components and computer implemented methods which may be found in a system for providing sales information to sales professionals according to various embodiments described herein.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Definitions

As used herein, the term "computer" refers to a machine, apparatus, or device that is capable of accepting and performing logic operations from software code. The term "application", "software", "software code" or "computer software" refers to any set of instructions operable to cause a computer to perform an operation. Software code may be operated on by a "rules engine" or processor. Thus, the methods and systems of the present invention may be performed by a computer or computing device having a processor based on instructions received by computer applications and software.

The term "client device" as used herein is a type of computer or computing device comprising circuitry and configured to generally perform functions such as recording audio, photos, and videos; displaying or reproducing audio, photos, and videos; storing, retrieving, or manipulation of electronic data; providing electrical communications and network connectivity; or any other similar function. Non-limiting examples of electronic devices include: personal computers (PCs), workstations, laptops, tablet PCs including the iPad, cell phones including iOS phones made by Apple Inc., Android OS phones, Microsoft OS phones, Blackberry phones, digital music players, or any electronic device capable of running computer software and displaying information to a user, memory cards, other memory storage devices, digital cameras, external battery packs, external charging devices, and the like. Certain types of electronic devices which are portable and easily carried by a person from one location to another may sometimes be referred to as a "portable electronic device" or "portable device". Some non-limiting examples of portable devices include: cell phones, smartphones, tablet computers, laptop computers, wearable computers such as Apple Watch, other smartwatches, Fitbit, other wearable fitness trackers, Google Glasses, and the like.

The term "computer readable medium" as used herein refers to any medium that participates in providing instructions to the processor for execution. A computer readable medium may take many forms, including but not limited to, non-volatile media, volatile media, and transmission media. Non-volatile media includes, for example, optical, magnetic disks, and magneto-optical disks, such as the hard disk or the removable media drive. Volatile media includes dynamic memory, such as the main memory. Transmission media includes coaxial cables, copper wire and fiber optics, including the wires that make up the bus. Transmission media may also take the form of acoustic or light waves, such as those generated during radio wave and infrared data communications.

As used herein the term "data network" or "network" shall mean an infrastructure capable of connecting two or more computers such as client devices either using wires or wirelessly allowing them to transmit and receive data. Non-limiting examples of data networks may include the internet or wireless networks or (i.e. a "wireless network") which may include Wifi and cellular networks. For example, a network may include a local area network (LAN), a wide area network (WAN) (e.g., the Internet), a mobile relay network, a metropolitan area network (MAN), an ad hoc network, a telephone network (e.g., a Public Switched Telephone Network (PSTN)), a cellular network, or a voice-over-IP (VoIP) network.

As used herein, the term "database" shall generally mean a digital collection of data or information. The present invention uses novel methods and processes to store, link, and modify information such digital images and videos and user profile information. For the purposes of the present disclosure, a database may be stored on a remote server and accessed by a client device through the internet (i.e., the database is in the cloud) or alternatively in some embodiments the database may be stored on the client device or remote computer itself (i.e., local storage). A "data store" as used herein may contain or comprise a database (i.e. information and data from a database may be recorded into a medium on a data store).

As used herein, the term "DEAL" shall generally refer to an agreement or compromise between a buyer, the entity seeking to make a purchase, and seller or user, the entity seeking to make a sale, to transact goods and/or services at an agreed upon price.

As used herein, the term "salesperson" shall generally refer to any person representing the seller entity of the DEAL and is the user of this system for the purpose of receiving aid and assistance towards the completion of one or more DEALS.

As used herein, the term "key player" shall generally refer to any person representing the buyer entity of the DEAL and who are determined by the salesperson as having a degree of influence over the success of completing the DEAL.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New computer-implemented systems and methods for providing sales information to sales professionals are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. As perhaps best shown by FIG. 1, an illustrative example of some of the physical components which may comprise a system for providing sales information to sales professionals ("the system") 100 according to some embodiments is presented. The system 100 is configured to facilitate the transfer of data and information between one or more access points 103, client devices 400, and servers 300 over a data network 105. Each client device 400 may send data to and receive data from the data network 105 through a network connection 104 with an access point 103. A data store 308 accessible by the server 300 may contain one or more databases. The data may comprise any information pertinent to one or more users 101 input into the system 100 including information on or describing one or more users 101, information on or describing one or more seller entities, information on or describing one or more buyer entities, information on or describing one or more DEALS, information requested by one or more users 101, information supplied by one or more users 101, and any other information which a user 101 may be provided such as for training and educational purposes.

In this example, the system 100 comprises at least one client device 400 (but preferably more than two client devices 400) configured to be operated by one or more users 101. Client devices 400 can be mobile devices, such as laptops, tablet computers, personal digital assistants, smart phones, and the like, that are equipped with a wireless network interface capable of sending data to one or more servers 300 with access to one or more data stores 308 over a network 105 such as a wireless local area network (WLAN). Additionally, client devices 400 can be fixed devices, such as desktops, workstations, and the like, that are equipped with a wireless or wired network interface capable of sending data to one or more servers 300 with access to one or more data stores 308 over a wireless or wired local area network 105. The present invention may be implemented on at least one client device 400 and/or server 300 programmed to perform one or more of the steps described herein. In some embodiments, more than one client device 400 and/or server 300 may be used, with each being programmed to carry out one or more steps of a method or process described herein.

In some embodiments, the system 100 may be configured to facilitate the communication of information to and from one or more users 101, through their respective client devices 400, and servers 300 of the system 100. Users 101 of the system 100 may include one or more salespersons and any other individual associated with a seller entity. Typically, users 101 describe individuals that desire to create or facilitate the formation of a DEAL with a buyer entity in order to transact goods and/or services at an agreed upon price. The user 101 may provide data and information describing a DEAL and data and information describing one or more key players to the system 100 and the system 100 may provide sales information to the user 101 in real-time which may be used to create or facilitate the formation of the DEAL and which may otherwise not be available to the user 101.

Figure 2:
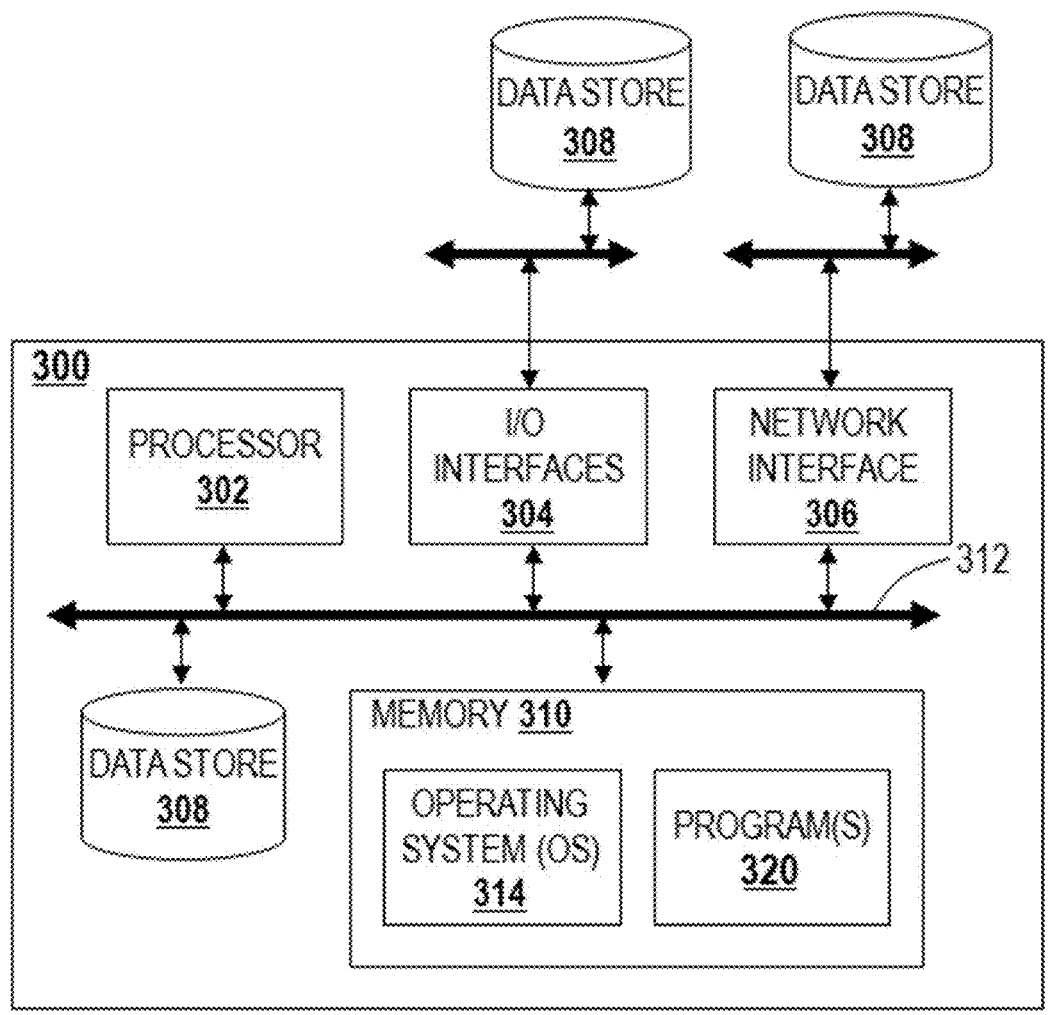
FIG. 2 illustrates a block diagram showing an example of a server which may be used by the system as described in various embodiments herein.

Referring now to FIG. 2, in an exemplary embodiment, a block diagram illustrates a server 300 of which one or more may be used in the system 100 or standalone and which may be a type of computing platform. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 2 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, the data network 105, the enterprise, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 is a type of memory and may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 may include a suitable operating system (O/S) 314 and one or more programs 320.

The operating system 314 essentially controls the execution of other computer programs, such as the one or more programs 320, and provides scheduling, input-output control, file and data management, memory management, and communication control and related services. The operating system 314 may be, for example Windows NT, Windows 2000, Windows XP, Windows Vista, Windows 7, Windows 8, Windows 10, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C. and various other vendors), Android and variants thereof (available from Google, Inc. of Mountain View, Calif.), Apple OS X and variants thereof (available from Apple, Inc. of Cupertino, Calif.), or the like. The one or more programs 320, such as a rules engine 321 (FIG. 4) and an instructional engine 322 (FIG. 4) may be configured to implement the various processes, algorithms, methods, techniques, etc. described herein.

Figure 3:
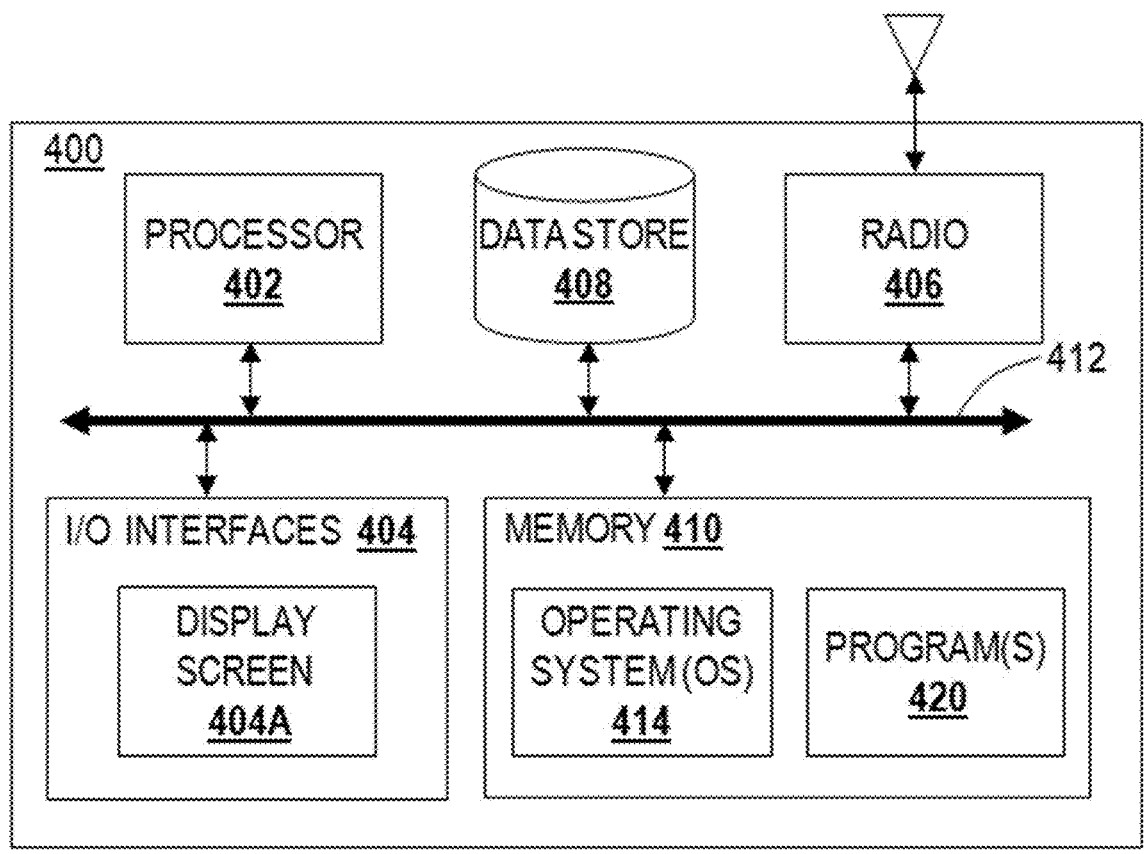
FIG. 3 shows a block diagram illustrating an example of a client device which may be used by the system as described in various embodiments herein.

Referring to FIG. 3, in an exemplary embodiment, a block diagram illustrates a client device 400 of which one or more may be used in the system 100 or the like and which may be a type of computing platform. The client device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 3 depicts the client device 400 in an oversimplified manner, and a practical embodiment may include additional components and suitably configured processing logic to support known or conventional operating features that are not described in detail herein. The components (402, 404, 406, 408, and 410) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the client device 400, a semiconductor-based microprocessor (in the form of a microchip or chip set), or generally any device for executing software instructions. When the client device 400 is in operation, the processor 402 is configured to execute software stored within the memory 410, to communicate data to and from the memory 410, and to generally control operations of the client device 400 pursuant to the software instructions. In an exemplary embodiment, the processor 402 may include a mobile optimized processor such as optimized for power consumption and mobile applications.

The I/O interfaces 404 can be used to receive data and user input and/or for providing system output. User input can be provided via a plurality of I/O interfaces 404, such as a keypad, a touch screen, a camera, a microphone, a scroll ball, a scroll bar, buttons, bar code scanner, voice recognition, eye gesture, and the like. System output can be provided via a display screen 404A such as a liquid crystal display (LCD), touch screen, and the like. The I/O interfaces 404 can also include, for example, a global positioning service (GPS) radio, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the client device 400. Additionally, the I/O interfaces 404 may be used to output notifications to a user and can include a speaker or other sound emitting device configured to emit audio notifications, a vibrational device configured to vibrate, shake, or produce any other series of rapid and repeated movements to produce haptic notifications, and/or a light emitting diode (LED) or other light emitting element which may be configured to illuminate to provide a visual notification.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication.

The data store 408 may be used to store data and is therefore a type of memory. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs 420, each of which includes an ordered listing of executable instructions for implementing logical functions. In the example of FIG. 3, the software in the memory system 410 includes a suitable operating system (O/S) 414 and programs 420.

The operating system 414 essentially controls the execution of other computer programs, and provides scheduling, input-output control, file and data management, memory management, and communication control and related services. The operating system 414 may be, for example, LINUX (or another UNIX variant), Android (available from Google), Symbian OS, Microsoft Windows CE, Microsoft Windows 7 Mobile, Microsoft Windows 10, iOS (available from Apple, Inc.), webOS (available from Hewlett Packard), Blackberry OS (Available from Research in Motion), and the like. The programs 420 may include a communication application 421 (FIG. 4) and various applications, add-ons, etc. configured to provide end user functionality with the client device 400. For example, exemplary programs 420 may include, but not limited to, a web browser, social networking applications, streaming media applications, games, mapping and location applications, electronic mail applications, financial applications, and the like. In a typical example, the end user typically uses one or more of the programs 420 along with a network 105 to manipulate information of the system 100.

Figure 4:
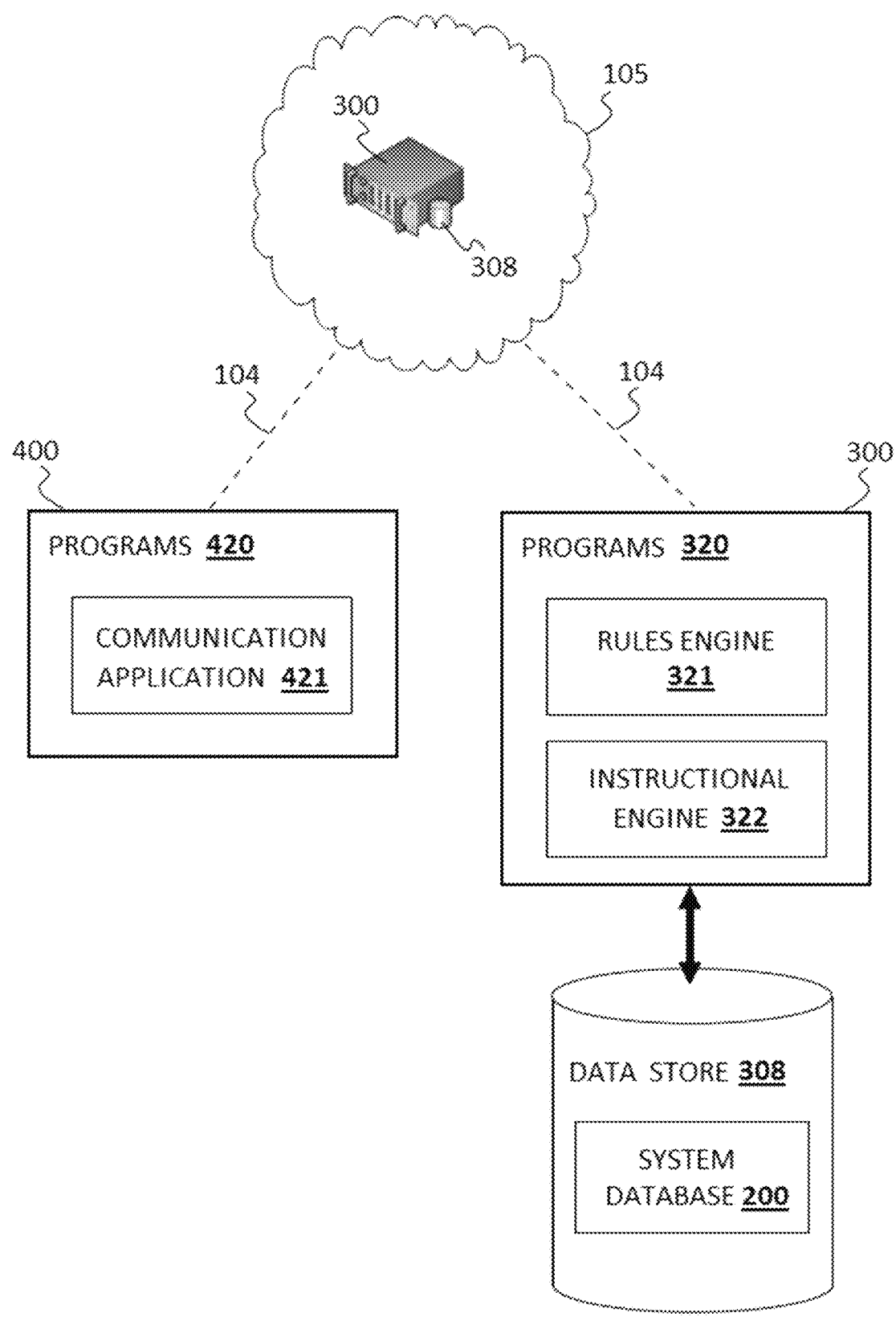
FIG. 4 depicts a block diagram illustrating some applications of a system for providing sales information to sales professionals which may function as software rules engines according to various embodiments described herein.
Figure 5:
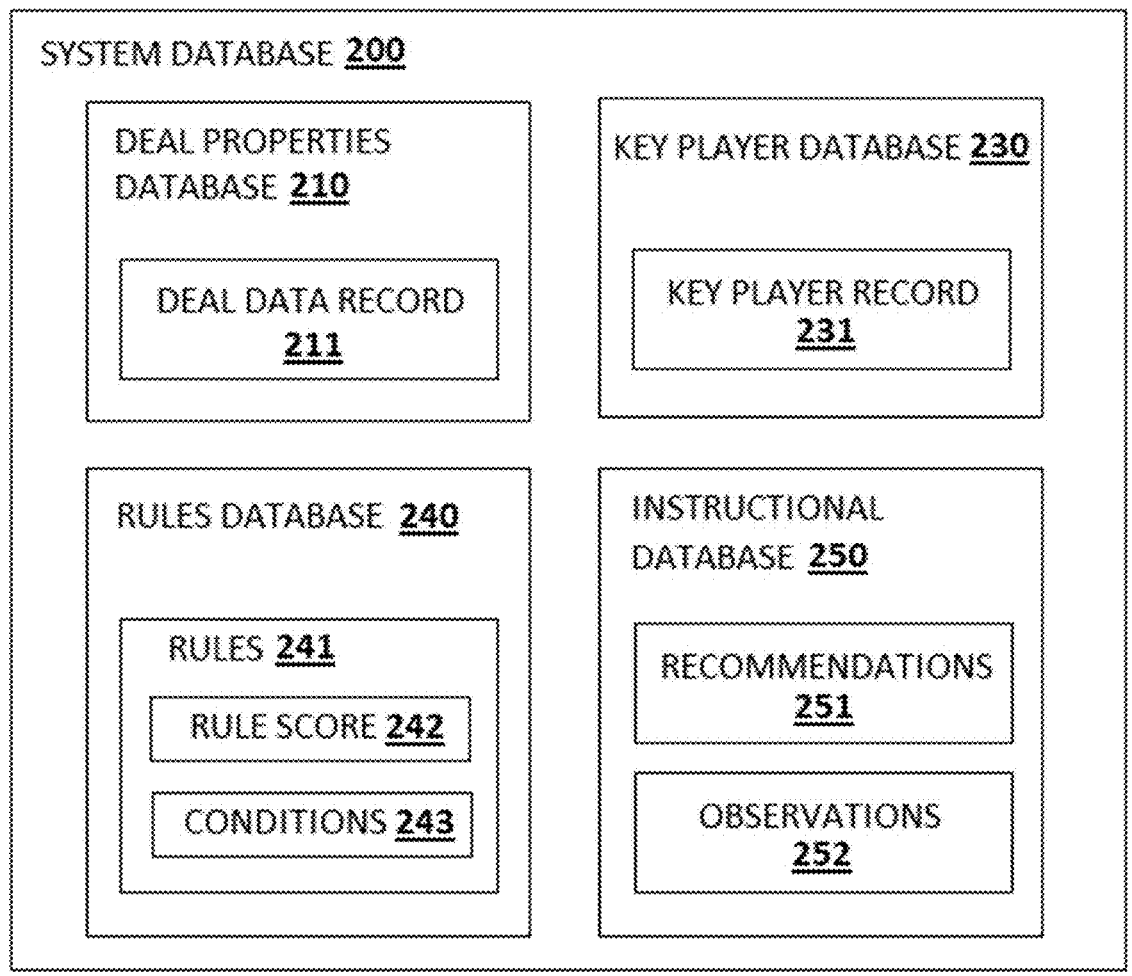
FIG. 5 illustrates a block diagram illustrating an example of a system database according to various embodiments described herein.

Referring now to FIG. 4 and FIG. 5, a block diagram showing some software rules engines which may be found in a system 100 (FIG. 1) and which may optionally be configured to run on a server 300 (FIGS. 1 and 2) and/or a client device 400 (FIGS. 1 and 3) which may be in communication with a system database 200 according to various embodiments described herein are illustrated. In this and some embodiments, one or more servers 300 may be configured to run one or more software rules engines or programs such as a rules engine 321 and an instructional engine 322 while a client device 400 may be configured to run one or more software rules engines or programs such as a communication application 421. The server 300 and client device 400 may be in wired and/or wireless electronic communication through a network 105 with a data store 308 comprising a database, such as a system database 200. The engines 321, 322, 421, may read, write, or otherwise access data in one or more databases of the data store 308. Additionally, the engines 321, 322, 421, may be in electronic communication so that data may be readily exchanged between the engines 321, 322, 421.

In other embodiments, a rules engine 321, instructional engine 322, and/or communication application 421 may be configured to run on one or more client devices 400 and/or servers 300 with data transferred to and from one or more servers 300 in communication with a data store 308 through a network 105. In still further embodiments, a server 300 or a client device 400 may be configured to run a rules engine 321, instructional engine 322, and/or communication application 421. It should be understood that the functions attributed to the engines 321, 322, 421, described herein are exemplary in nature, and that in alternative embodiments, any function attributed to any engine 321, 322, 421, may be performed by one or more other engines 321, 322, 421.

In some embodiments, the rules engine 321 may comprise or function as identification logic stored in the memory 310, 410 which may be executable by the processor 302, 402, of a server 300 and/or client device 400. The rules engine 321 may identify a rule corresponding to a key player data record 231 from the key player database 230. The rules engine 321 may also identify and manage one or more rules 241 in a rules database 240 and determine if the one or more rules are satisfied with the information populating the deal data record 211 and/or information populating the key player data record 231. Additionally, the rules engine 321 may read, write, edit, create, import, export, and delete rules 241 and the information that they contain within the rules database 240.

In some embodiments, the instructional engine 322 may comprise or function as retrieval logic stored in the memory 310, 410 which may be executable by the processor 302, 402, of a server 300 and/or client device 400. The instructional engine 322 may retrieve one or more recommendations 251 and/or observations 252 from the instructional database 250 which may be associated with one or more rules 241 of the rules database 240. In preferred embodiments, the instructional engine 322 may retrieve one or more recommendations 251 which may be associated with one or more rules 241 from the instructional database 250. Additionally, the instructional engine 322 may generate output based on the retrieved recommendations 251, and the output may include: action items for the user to act upon as tasks to further the DEAL; questions to be used to further refine the kp and/or deal properties; consequence statements (results of the observation for s or v); generate a text message; generate an email; and/or generate other responses.

In some embodiments, the communication application 421 may comprise or function as input logic stored in the memory 310, 410 which may be executable by the processor 302, 402, of a server 300 and/or client device 400. The communication application 421 may receive input from the user 101, preferably through an I/O interface 304,404, and the input may comprise information for populating a deal data record 211 of a deal properties database 210 and information for populating a key player data record 231 of a key player database 230. The communication application 421 may also read, write, edit, create, import, export, and delete information in a deal properties database 210, key player database 230, rules database 240, and instructional database 250.

In some embodiments, the communication application 421 may comprise or function as display logic stored in the memory 310, 410 which may be executable by the processor 302, 402, of a server 300 and/or client device 400. The communication application 421 may display to the user 101, via a display screen 404A of the client device 400, information which may be output by the system 100 such as one or more recommendations 251 and observations 252. Additionally, the communication application 421 may calculate and display to the user 101 a legitimacy value 226 corresponding to the legitimacy of a DEAL, a position value 227 corresponding to the position of a DEAL, a total deal score 225, or the like.

As shown in FIGS. 4 and 5, in some embodiments, the system 100 may comprise a database, such as a system database 200, optionally stored on a data store 308, 408, of one or more servers 300 and/or client device 400 accessible to a rules engine 321, instructional engine 322, and/or communication application 421. A system database 200 may comprise any data and information input to and output by the system 100. This data may include one or more other databases such as a deal properties database 210, a key player database 230, a rules database 240, and an instructional database 250. It should be understood that the described structure of the system database 200 is exemplary in nature, and that in alternative embodiments, the data contained within the system database 200 may be organized in any other way.

Figure 6:
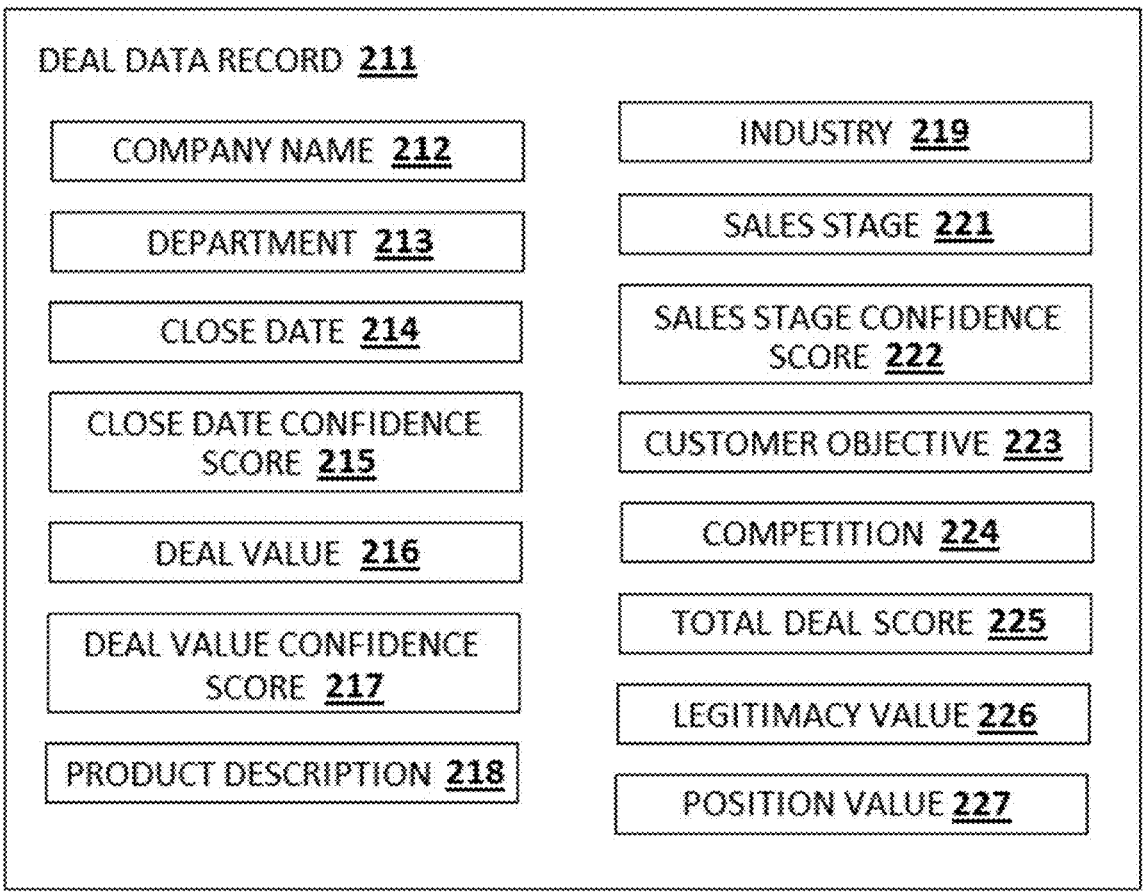
FIG. 6 shows a block diagram illustrating an example of a deal data record according to various embodiments described herein.

Turning now to FIGS. 5 and 6, the deal properties database 210 may comprise one or more deal data records 211 and each deal data record 211 may contain information in one or more data fields which may describe one or more parameters of a DEAL. These data fields may include: company name 212; department 213; close date 214; close date confidence score 215; deal value 216; deal value confidence score 217; product description 218; industry 219; sales stage 221; sales stage confidence score 222; customer objective 223; competition 224; total deal score 225, legitimacy value 226, and/or position value 227.

The company name 212 data field may contain information or data input by the user 101 which may describe the name of a company, which may be the buyer entity, with which a user 101 may desire to form a DEAL with. Additionally, the company name 212 data field may contain information or data which may describe addresses, contact information, billing information, and/or any other information which may describe a company. For example, the company name 212 data field may contain "Coca Cola Company".

The department 213 data field may contain information or data input by the user 101 which may describe contact information of the department or unit of the company a user 101 may desire to form a DEAL with. For example, the department 213 data field may contain "Procurement Department".

The close date 214 data field may contain information or data input by the user 101 which may describe the anticipated date at which the DEAL may be finalized or agreed upon. For example, the date 214 data field may contain "Mar. 27, 2018".

The close date confidence score 215 data field may contain information or data input by the user 101 which may describe a score in which the user 101 expresses an estimate of their confidence in the close date 214 being the actual date at which the DEAL may be finalized or agreed upon. For example, a close date confidence score 215 of 10% for the DEAL close date 214 means that the user 101 believes that there is 10% chance that the close date 215 specified may remain the same.

The deal value 216 data field may contain information or data input by the user 101 which may describe the currency value at which the DEAL may be finalized or agreed upon. For example, the deal value 216 data field may contain $100,00.00.

The deal value confidence score 217 data field may contain information or data input by the user 101 which may describe a score in which the user 101 expresses an estimate of their confidence in the deal value 216 being the actual value at which the DEAL may be finalized or agreed upon. For example, a deal value confidence score 217 of 80% for the deal value 216 means that the user 101 believes that there is 80% chance that the deal value 216 specified may remain the same.

The product description 218 data field may contain information or data input by the user 101 which may describe the product or solution which is being exchanged for the deal value 216. For example, the product description 218 data field may contain "50 metric tons of sugar".

The industry 219 data field may contain information or data input by the user 101 which may describe the type of industry the DEAL may be associated with. For example, the industry 219 data field may contain "Food and Beverage".

The sales stage 221 data field may contain information or data input by the user 101 which may describe a stage at which the DEAL may be relative to completion. For example, the sales stage 221 data field may contain one of the following set of values: (1) Prospecting, (2) Qualification, (3) Needs Analysis, (4) Proposal/Price Quote, (5) Negotiation/Review, (6) Closed/Won, and (7) Closed/Lost.

The sales stage confidence score 222 data field may contain information or data input by the user 101 which may describe a score in which the user 101 expresses an estimate of their confidence in the sales stage 221 being the actual stage at which the DEAL may be relative to completion. For example, a sales stage confidence score 222 of 90% for the sales stage 221 means that the user 101 believes that there is 90% chance that the sales stage 221 is the actual stage at which the DEAL may be relative to completion.

The customer objective 223 data field may contain information or data input by the user 101 which may describe the objective of the buyer or customer. For example, the customer objective 223 data field may contain "Maintain Inventory".

The competition 224 data field may contain information or data input by the user 101 which may describe one or more competitors with which the user 101 may be competing with for the buyer or customer to purchase or complete the deal with. For example, the competition 224 data field may contain "Blue Diamond Sugar Company" and "Domino Sugar Company". In some embodiments, one or more competitors, entities described in the competition 224 data field, may be associated to a key player of a key player data record 231. In further embodiments, the competition 224 data field may contain information or data describing one or more types of competitors and this data may include: status quo, meaning the customer might continue to use the existing solution they are currently using (or nothing) and stay with the "status quo"; internal resources, this means they might have internal resources to build the solution they are considering purchasing; and direct, meaning direct competitors, and when chosen, the user may add the name of the competitor. Once a key player is identified, if their Advocacy score 238 is less than 5, a user 101 may be enabled to input data associating a Competitor with a Key Player. For example, the Key Player Joe Hennessey may be leaning towards using the solution from Blue Diamond Sugar Company.

The total deal score 225 data field may contain information or data output by the communication application 421 which may include a score or percentage determined by the system 100 which may describe how well the sales person is positioned in the deal, such as weakly positioned, OK or moderately positioned, and strongly positioned. For example, a total deal score 225 of 67 for the total deal score 225 means that system 100 has determined or calculated that the sales person is OK or moderately positioned in the DEAL. In some embodiments, a total deal score 225 may be calculated, such as by addition, subtraction, multiplication, division, weighted average, average, and/or any other mathematical operation, from a combination of a close date confidence score 215, a deal value confidence score 217, a rule score 242, and/or a sales stage confidence score 222. In further embodiments, one or more rules scores 242 of one or more rules 241 that have a condition 243 satisfied by the data populating a deal data record 211 and/or a key player record 231 may be used to determine the total deal score 225.

The legitimacy value 226 data field may contain information or data output by the communication application 421 which may include a score or percentage determined by the system 100 which may describe the legitimacy of a DEAL which defines the likelihood that a key player will favor pursuing the DEAL. In some embodiments, the data used to determine the legitimacy value 226 may comprise an impact score 235 and a priority score 236.

The position value 227 data field may contain information or data output by the communication application 421 which may include a score or percentage determined by the system 100 which may describe the position of a DEAL which defines the position or standing of the user 101 in the DEAL. In some embodiments, the data used to determine the position value 227 may comprise an advocacy score 238 and an access score 237.

Figure 7:
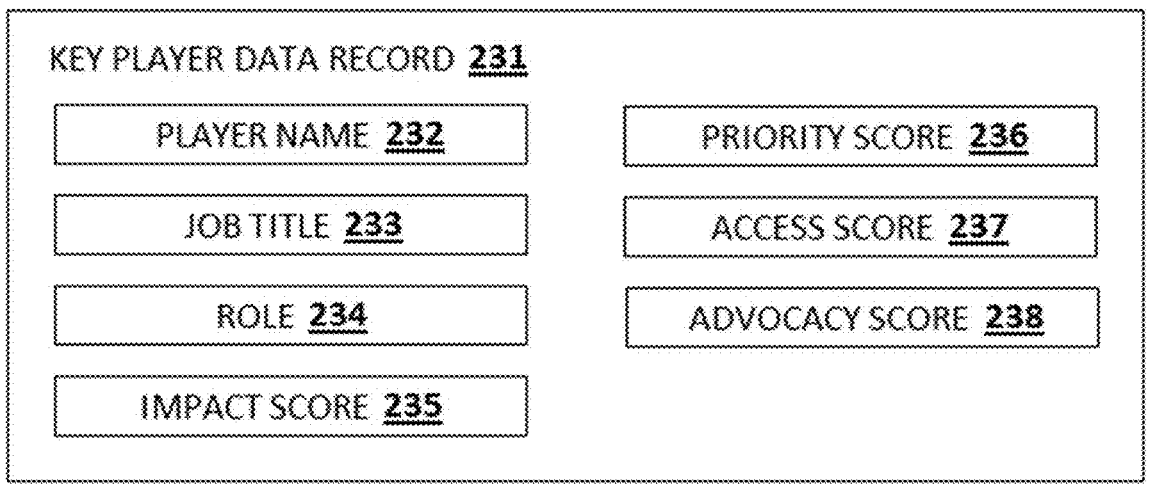
FIG. 7 depicts a block diagram illustrating an example of a key player data record according to various embodiments described herein.

Turning now to FIGS. 5 and 7, the key player database 230 may comprise one or more key player records 231 and each key player record 231 may contain information in one or more data fields which may describe one or more parameters of a key player of a DEAL. A key player may refer generally to any individual of the buyer entity that may be associated with the completion of the DEAL. These data fields may include: player name 232; job title 233; role 234; impact score 235; priority score 236; access score 237; and/or advocacy score 238.

The player name 232 data field may contain information or data input by the user 101 which may describe the name of a key player of a buyer entity with which a user 101 may desire to form a DEAL with. For example, the player name 232 data field may contain "Bob Brown".

The job title 233 data field may contain information or data input by the user 101 which may describe the job title of the key player. For example, the job title 233 data field may contain "Chief Executive Officer".

The role 234 data field may contain information or data input by the user 101 which may describe the role that the key player may have in the formation or completion of the DEAL as perceived by the user 101. For example, the role 234 data field may contain one of the following: (1) Decision Maker, (2) Decision Influencer, or (3) Unknown.

The impact score 235 data field may contain information or data which may describe a score input by the user 101 for the key player's impact on the formation or completion of the DEAL as perceived by the user 101. For example, the impact score 235 data field may contain "5" from a scale of zero to ten with zero referring to no impact and ten referring to the greatest impact on the formation or completion of the DEAL.

The priority score 236 data field may contain information or data which may describe a score input by the user 101 for the key player's priority for the formation or completion of the DEAL as perceived by the user 101. For example, the priority score 236 data field may contain "2" from a scale of zero to ten with zero referring to the formation or completion of the DEAL not being a priority for the key player and ten referring to the formation or completion of the DEAL being the highest priority for the key player.

The access score 237 data field may contain information or data which may describe a score input by the user 101 which describes the amount of access the user 101 has to the key player as perceived by the user 101. For example, the access score 237 data field may contain "1" from a scale of zero to ten with zero referring to the user 101 not having access to the key player and ten referring to the user 101 being able to contact or access the key player with little effort.

The advocacy score 238 data field may contain information or data which may include a score input by the user 101 which describes the advocacy of the key player toward the user's 101 solution for the DEAL as perceived by the user 101. For example, the advocacy score 238 data field may contain "8" from a scale of zero to ten with zero referring to the user 101 not perceiving the key player as being an advocate toward the user's 101 solution and ten referring to the user 101 perceiving the key player as being an advocate toward the user's 101 solution.

Referencing FIG. 5 and Table 1 below, the rules database 240 may comprise one or more rules 241. A rule 241 may be a heuristic or form of advice that specifies one or more conditions 243 associated with the DEAL attributes or properties that may, when triggered or put into use, produce one or more of the following: (1) a determination that the conditions 243 imply a Vulnerability or Strength, (2) a recommendation 251, and (3) an integer indicating a rule score 242 that may be added, subtracted, or otherwise used to calculate to adjust the total deal score 225. Table 1 shows examples of rules 241 which may be stored in a rules database 240 or repository according to various embodiments described herein. The system 100 is neither limited to, nor required to use these example rules 241.

TABLE 1

Example Rules Which May Be Stored In A Rules Database

| Unique Rule ID | Conditions to Trigger Rule | Rule Score | STRENGTH (S) or VULNERABILITY (V) |
|---|---|---|---|
| KP1 | Any KEY PLAYER has title or ROLE missing | No scoring identified | V |
| KP2 | KEY PLAYER count >= 5 and title defined and ROLE defined | 10 | S |
| KP3 | 2 <= KEY PLAYER count <= 4 and title defined and ROLE defined | 2 points for each kp | S |
| KP4 | KEY PLAYER count < 2 title defined and ROLE defined | 2 points for each kp | V |
| KP5 | No KEY PLAYER with ROLE = decision maker | 0 | V |
| KP6 | At least one KEY PLAYER with ROLE = decision maker | 10 | S |
| KP7 | KEY PLAYER ACCESS score > 8 | 5 | S |
| KP8 | 5 >= KEY PLAYER ACCESS score < 8 | 3 | S |
| KP9 | KEY PLAYER ACCESS score < 5 | 0 | V |
| KP10 | all KEY PLAYER IPAA scores >= 8 and ROLE = decision maker | 20 | S |
| KP11 | all KEY PLAYER IPAA scores >= 8 and ROLE = decision influencer | 10 | S |
| KP12 | average of ADVOCACY < 5 on KEY PLAYERs with IMPACT >=8 | 0 | V |
| KP13 | average of ADVOCACY >= 5 and < 8 on key players with IMPACT >=8 | 5 | V |
| KP14 | average of ADVOCACY >= 8 on key players with IMPACT >=8 | 10 | S |
| KP15 | average of PRIORITY < 5 on key players with IMPACT >=8 | 0 | V |
| KP16 | average of PRIORITY >= 5 and < 8 on key players with IMPACT >= 8 | 5 | S |
| KP17 | average of PRIORITY >= 8 on key players with IMPACT >= 8 | 10 | S |
| KP18 | KEY PLAYER ROLE = decision maker and PRIORITY < 5 | 0 | V |
| KP19 | KEY PLAYER ROLE = decision maker and PRIORITY < 8 and PRIORITY >= 5 | 5 | V |
| KP20 | KEY PLAYER ROLE = decision maker and PRIORITY >= 8 | 10 | S |
| KP21 | KEY PLAYER ROLE = decision maker and PRIORITY missing | 0 | V |
| KP22 | KEY PLAYER ROLE = decision maker and ADVOCACY < 5 | 0 | V |
| KP23 | KEY PLAYER ROLE = decision maker and ADVOCACY < 8 and ADVOCACY >= 5 | 5 | V |
| KP24 | KEY PLAYER ROLE = decision maker and ADVOCACY >= 8 | 10 | S |
| KP25 | KEY PLAYER ROLE = decision maker and ADVOCACY missing | 0 | V |
| KP26 | KEY PLAYER ROLE = decision maker and ACCESS < 5 | 0 | V |
| KP27 | KEY PLAYER ROLE = decision maker and ACCESS < 8 and ACCESS >= 5 | 5 | V |
| KP28 | KEY PLAYER ROLE = decision maker and ACCESS >= 8 | 10 | S |
| KP29 | KEY PLAYER ROLE = decision maker and ACCESS missing | 0 | V |
| KP30 | impact >=8, priority != null, impact !=null, accessibility != null (80% >= known) | 20 | S |
| KP31 | impact >=8, priority != null, impact !=null, accessibility != null (51% >= to 79% know | 15 | S |
| KP32 | impact >=8, priority != null, impact !=null, accessibility != null (51% < known) | 0 (0-25%) 5 (26-50) | V |
| KP33 | key player IPAA = unknown (Trigger if any of the IPAA values for any KP not set) | 0 | V |
| D1 | DEAL = unknown | 0 | V |
| D2 | DEAL CLOSE DATE = unknown | 0 | V |

TABLE 1-continued

Example Rules Which May Be Stored In A Rules Database

| Unique Rule ID | Conditions to Trigger Rule | Rule Score | STRENGTH (S) or VULNERABILITY (V) |
| --- | --- | --- | --- |
| D3 | DEAL COMPETITION = unknown | 0 | V |
| D4 | DEAL VALUE = unknown | 0 | V |
| D5 | DEAL CUSTOMER OBJECTIVE = unknown | 0 | V |
| D6 | DEAL PRODUCT/SOLUTION= unknown | 0 | V |

As can be seen in Table 1, each rule 241 may comprise a set of conditions 243 which may be used by the rules engine 321 to determine if the rule 241 is triggered. The rule 241 may be triggered if the information contained in the data populating a deal data record 211 of the deal properties database 210 and/or if the information contained in the data populating a key player data record 231 of the key player database 230 associated with a DEAL satisfies the conditions 243 of the rule 241. Each rule 241 may be associated with one or more observations 252 of the instructional database 250. Each rule 241 may also be described as a strength (S) or vulnerability (V) and therefore each observation 252 associated with the rule 241 may also be described as a strength (S) or vulnerability (V). A vulnerability (V) may generally describe or refer to a situation for the user 101 that may make it more difficult for the DEAL to advance or be closed successfully. A strength (S) may generally describe or refer to a situation for the user 101 that may make it easier for the DEAL to advance or be closed successfully.

Furthermore, each recommendation 251 may be associated with one or more observations 252 of an instructional database 250. The recommendations 251 and/or observations 252 may comprise text based information and/or pre-recorded video multimedia files specific for the recommendation 251 to which the observation 252 is associated with. For example, a recommendation 251 may comprise an instructional video having a recording of a person speaking on how the user 101 can make sure that the user 101 has identified all the key players of a DEAL. Additionally, the recommendations 251 and/or observations 252 may be associated with data which may be used by the instructional engine 322 to genera one or more responses such as: action items for the user to act upon as tasks to further the deal; questions to be used to further refine the KP and/or deal properties; consequence statements (results of the observation for S or V); generate a text message; generate and email; and/or generate other responses.

Figure 10:
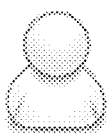
FIG. 10 depicts an example of a key player record for the exemplary key player of Bob Brown according to various embodiments described herein.
Figure 11:
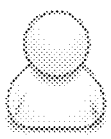
FIG. 11 illustrates an example of a key player record for the exemplary key player of Susie Smith according to various embodiments described herein.

Referring now to FIGS. 10 and 11 and also to Table 1, an example of analyzing Rule KP10 will be discussed. Referencing Table 1, it can be seen that the exemplary rule 241 KP10 is: all impact score 235, priority score 236, access score 237, and advocacy score 238 scores >=8 and ROLE=decision maker defined. The rule 241 KP10 has the following two conditions in it: 1. all KEY PLAYER IPAA scores >=8 and 2. ROLE=decision maker.

The condition 243 "If all KEY PLAYER IPAA scores >=8" of Rule KP10 may be analyzed by the rules engine 321 as follows for Bob Brown and Susie Smith:
Bob Brown score=6+2+2+1=11→11>=8→TRUE
Susie Smith score=5+8+8+7=28→28>=8→TRUE The condition 243 "AND if ROLE=Decision maker defined" of Rule KP10 may be analyzed by the rules engine 321 as follows for Bob Brown and Susie Smith:
Bob Brown ROLE=Decision Maker→TRUE
Hence, condition #1 is satisfied as TRUE and condition #2 is satisfied as TRUE Then Rule KP10 is triggered or satisfied which may result in the following actions: an observation 252 and a recommendation 251 may be displayed to a user 101 comprising coaching content assigned to KP10 which may include multimedia content and/or text from the instructional database 250; a rule score 242 of 20 for this rule 241 is added to the total deal score 225 for this DEAL; satisfying this rule 241 is labeled as a strength (S) and the observation 252 associated with the rule 241 is therefore a strength; and the analysis of this rule 241 is complete.

Referring also to FIGS. 10 and 11 and also to Table 1, an example of analyzing Rule KP9 will be discussed. Referencing Table 1, it can be seen that the exemplary rule 241 KP9 is: any KEY PLAYER ACCESS score <5. The rule 241 KP9 has the following condition in it: 1. any access score 237 of a key player record 231 score <5.

The condition 243 "any access score 237 of a key player record 231 score <5" of Rule KP9 may be analyzed by the rules engine 321 as follows for Bob Brown and Susie Smith
Bob Brown ACCESS score=2→2<5→TRUE
Susie Smith ACCESS score=8→8<5→FALSE
Hence, condition #1 is satisfied as TRUE since there exists at least one key player having a key player record 231 defined with an access score 237 score less than 5.

Then Rule KP9 is triggered or satisfied which may result in the following actions: an observation 252 and a recommendation 251 may be displayed to a user 101 comprising coaching content assigned or associated to KP9 which may include multimedia content and/or text from the instructional database; a rule score 242 of 0 for this rule 241 is added to the total deal score 225 for this DEAL; satisfying this rule 241 is labeled as a vulnerability (V) and the observation 252 associated with the rule 241 is therefore a vulnerability; and the analysis of this rule 241 is complete.

Figure 8:
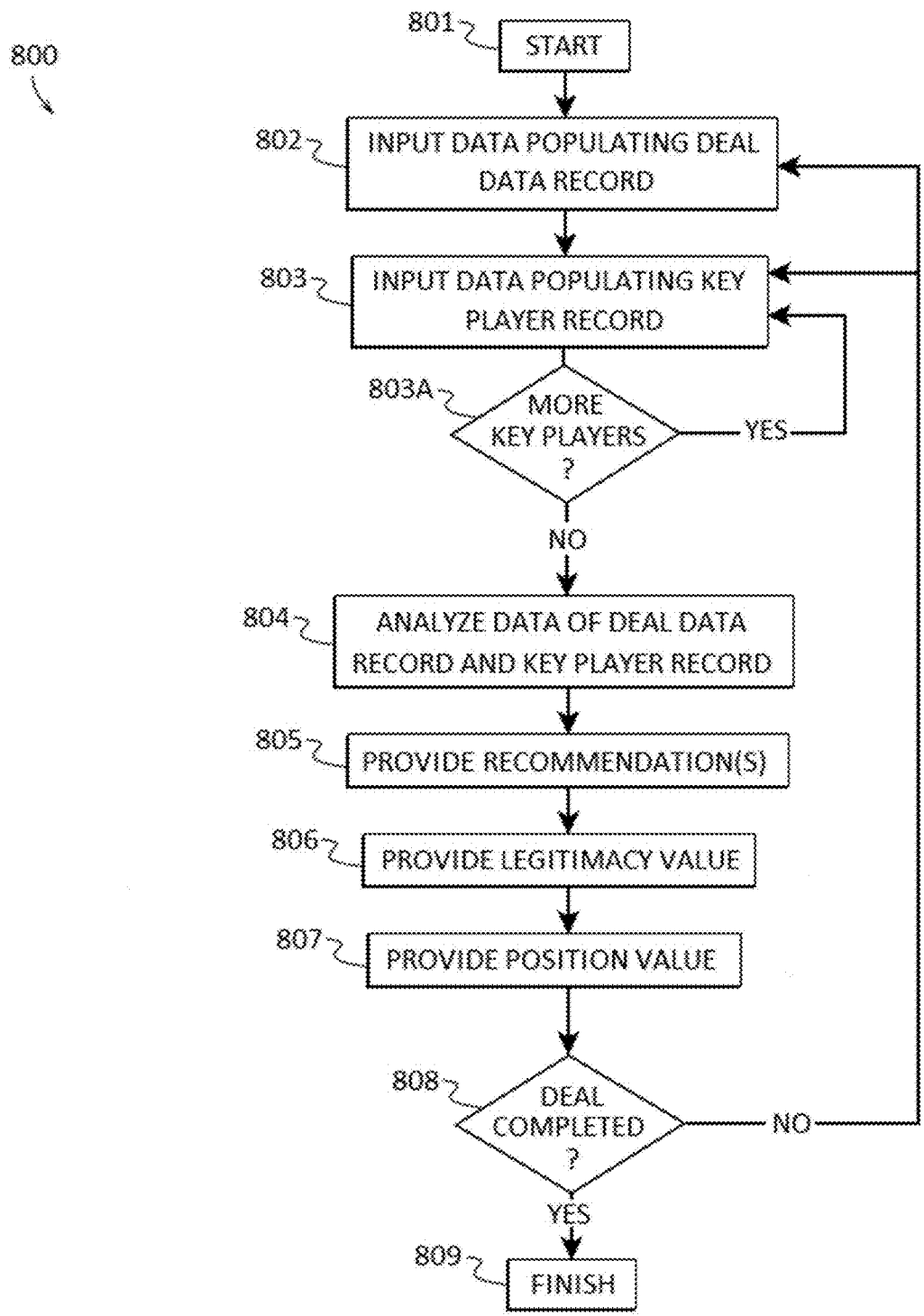
FIG. 8 illustrates a block diagram of an example of a computer-implemented method for determining and generating an electronic recommendation to a user according to various embodiments described herein.

A block diagram of an example of a method for determining and generating an electronic recommendation to a user ("the method") 800 according to various embodiments described herein is shown as an overview in FIG. 8. In some embodiments, the method 800 may start 801 and data populating a deal data record 211 of a DEAL may be input in step 802. In further embodiments, data populating one or more fields of the deal data record 211 may be input by a user 101 through a communication application 421. In further embodiments, this data may include: company name 212; department 213; close date 214; close date confidence score 215; deal value 216; deal value confidence score 217;

product description 218; industry 219; sales stage 221; sales stage confidence score 222; customer objective 223; and/or competition 224.

In step 803, data populating a key player record 231 of one or more key players of the DEAL may be input. In some embodiments, data populating one or more fields of the key player record 231 of each key player may be input by a user 101 through a communication application 421. In further embodiments, this data may include: player name 232; job title 233; role 234; impact score 235; priority score 236; access score 237; and/or advocacy score 238.

Next in decision block 803A, if there are more key players, the method 800 may return to step 803 and the data populating a key player record 231 of one or more key players of the DEAL may be input. If there are not more key players, the method 800 may continue to step 804.

In step 804, data of deal data record 211 and each key player record 231 may be analyzed by the rules engine 321 and the instructional engine 322. In some embodiments, the rules engine 321 may identify a rule 241 corresponding to the data populating the key player data record 231 and/or a rule 241 corresponding to the data populating the deal data record 211. In further embodiments, the instructional engine 322 may retrieve one or more observations 252 that may be associated with the identified rules 241.

In step 805, the recommendations 251 may be provided to the user 101. In some embodiments, the communication application 421 may display the one or more recommendations 251 to the user 101, via a display screen 404A of the client device 400 of the user 101. In further embodiments, each recommendation 251 may be associated with one or more observations 252 and the communication application 421 may display the one or more recommendations 251 and observations 252 to the user 101, via a display screen 404A of the client device 400 of the user 101. Preferably, each observation 252 may be selected from the group consisting of a strength and a vulnerability. In still further embodiments, one or more recommendations 251 may comprise a pre-recorded video multimedia file specific for the observation 252 associated with it. In this manner, the one or more recommendations 251, observations 252, and/or pre-recorded video multimedia file specific for the observation 252 associated with a recommendations 251 may be electronic recommendations which are displayed in electronic form on a display screen 404A of the client device 400 of the user 101.

In step 806, a legitimacy value 226 may be provided to the user 101. In some embodiments, the communication application 421 may calculate a legitimacy value 226 which may include a score or percentage determined by the system 100 which may describe the legitimacy of a DEAL which defines the likelihood that a key player will favor pursuing the DEAL. In some embodiments, the data used to determine the legitimacy value 226 may comprise an impact score 235 and a priority score 236 of a key player record 231. In further embodiments, the communication application 421 may provide the legitimacy value 226 by graphically displaying the legitimacy value 226 on a display screen 404A of the client device 400 of the user 101.

Figure 12:
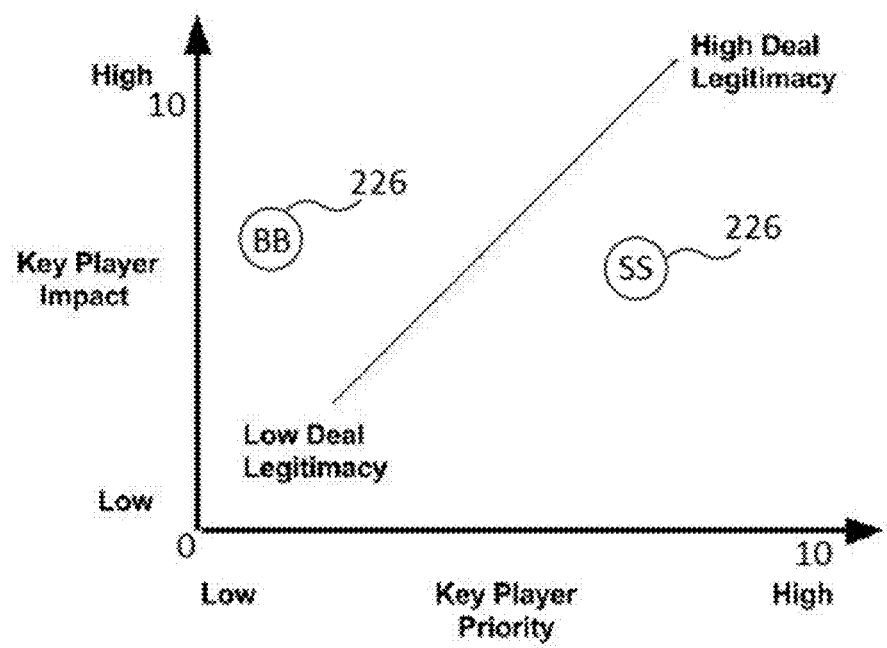
FIG. 12 shows an exemplary graphical representation of the legitimacy of a DEAL according to various embodiments described herein.

As shown in the example key player records 231 of FIGS. 10 and 11 and the example graphical representation of the legitimacy of the DEAL depicted in FIG. 12, in some embodiments, the legitimacy values 226 of one or more key players of the DEAL may be provided in graphical form. For the key player Bob Brown, the legitimacy value 226 may be determined to be (6,2) using the impact score 235 of six and the priority score 236 of two from his key player record 231 as labeled BB in FIG. 12. For the key player Susie Smith, the legitimacy value 226 may be determined to be (5,8) using the impact score 235 of five and the priority score 236 of eight from her key player record 231 as labeled SS in FIG. 12. The higher the impact score 235 and a priority score 236, the greater the legitimacy value 226 and the greater the legitimacy of the DEAL for that key player. Conversely, the lower the impact score 235 and a priority score 236, the lesser the legitimacy value 226 and the lesser the legitimacy of the DEAL for that key player. In this example, Susie Smith has a greater legitimacy value 226 and greater legitimacy of the DEAL than Bob Brown.

In step 807, a position value 227 may be provided to the user 101. In some embodiments, the communication application 421 which may include a score or percentage determined by the system 100 which may describe the position of a DEAL which defines the position or standing of the user 101 in the DEAL. In some embodiments, the data used to determine the position value 227 may comprise an advocacy score 238 and an access score 237 of a key player record 231. In further embodiments, the communication application 421 may provide the position value 227 by graphically displaying the position value 227 on a display screen 404A of the client device 400 of the user 101.

Figure 13:
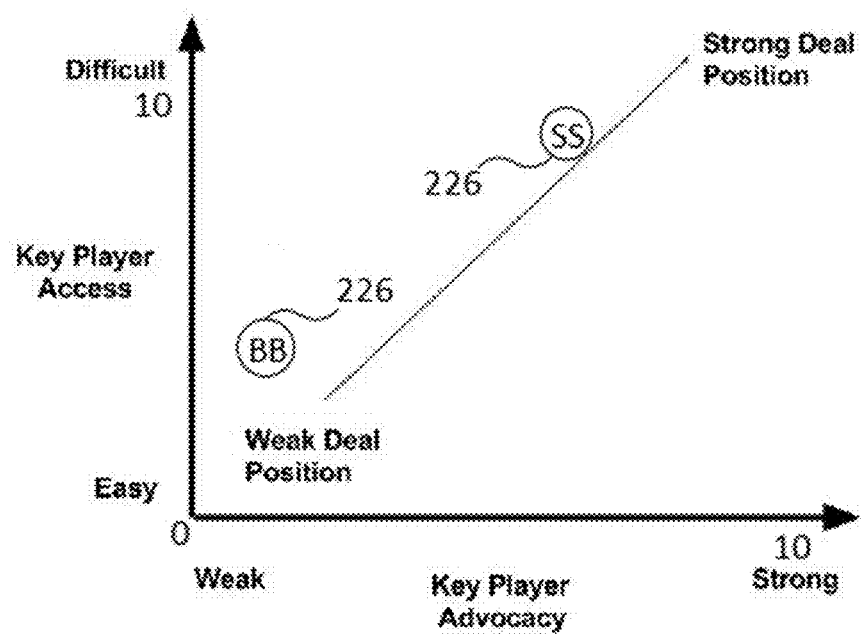
FIG. 13 depicts an exemplary graphical representation of the position of a DEAL according to various embodiments described herein.

As shown in the example key player records 231 of FIGS. 10 and 11 and the example graphical representation of the position of the DEAL depicted in FIG. 13, in some embodiments, the position value 227 of one or more key players of the DEAL may be provided in graphical form. For the key player Bob Brown, the position value 227 may be determined to be (2,1) using the access score 237 of two and the advocacy score 238 of one from his key player record 231 as labeled BB in FIG. 13. For the key player Susie Smith, the position value 227 may be determined to be (8,7) using the access score 237 of eight and the advocacy score 238 of seven from her key player record 231 as labeled SS in FIG. 13. The higher the access score 237 and the advocacy score 238, the greater the position value 227 and the greater the position or standing of the user 101 in the DEAL. Conversely, the lower the access score 237 and the advocacy score 238, the lesser the position value 227 and the lesser the position or standing of the user 101 in the DEAL. In this example, Susie Smith has a greater position value 227 than Bob Brown so the user 101 may have a better position or standing in the DEAL with Susie than with Bob.

At decision block 808 it may be determined if the DEAL is completed. In some embodiments, the communication application may determine the DEAL is completed if a close date 214 or other data has been input into the deal data record 211 of the DEAL. If the DEAL has not been completed, the method 800 may continue to step 802 and/or 803 to receive more input from the user 101 as it becomes available. If the DEAL is completed, the method 800 may finish 809.

Figure 9:
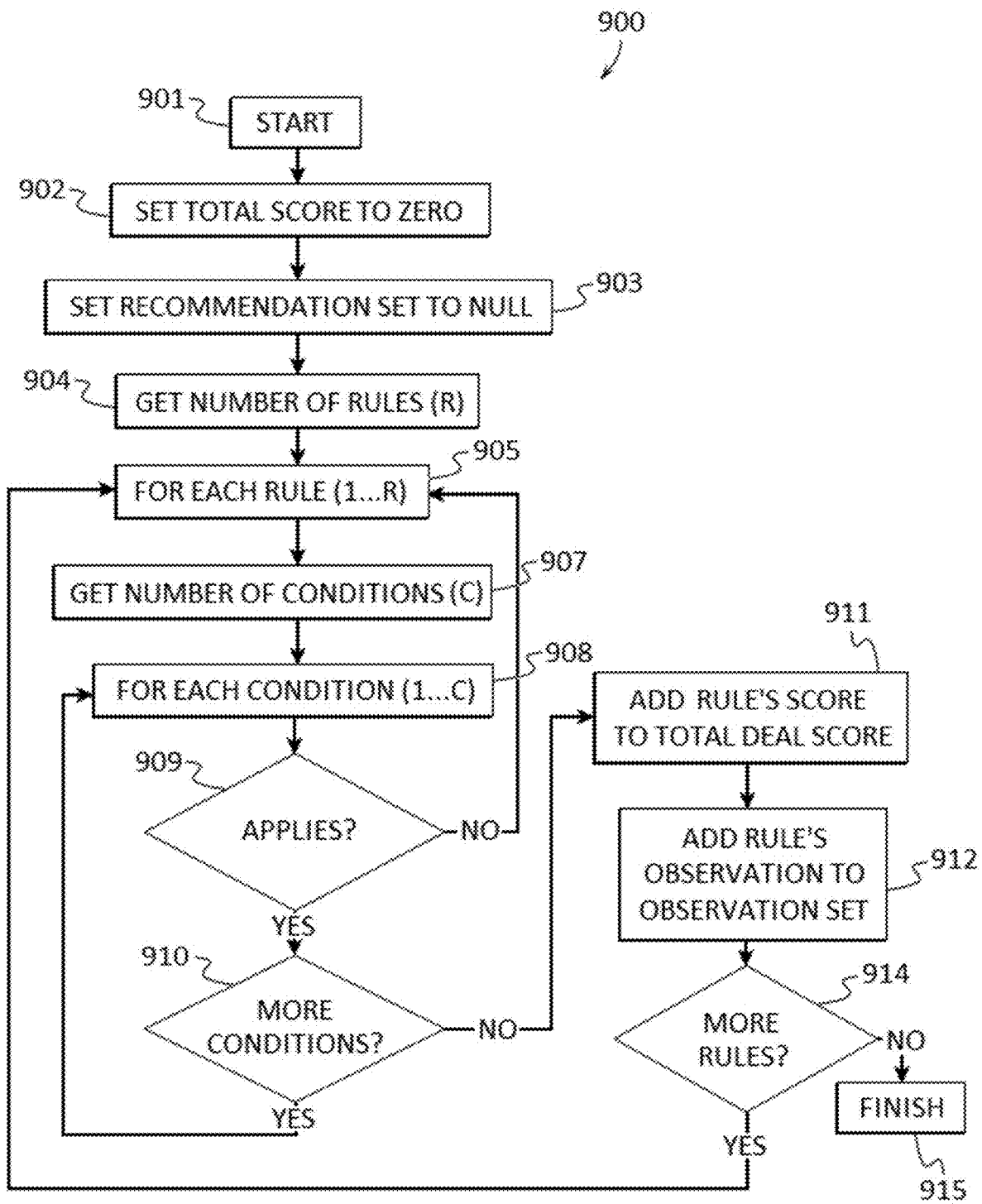
FIG. 9 shows a block diagram of another example of a computer-implemented method for determining and generating an electronic observation to a user according to various embodiments described herein.

A block diagram of another example of a method for determining and generating an electronic observation to a user ("the method") 900 according to various embodiments described herein is shown as an overview in FIG. 9. In some embodiments, the method 900 may be used for determining and generating an electronic observation using data populating a deal data record 211 and one or more key player records 231 of a DEAL so as to produce an electronic observation that may be used by the user 101 to advance the DEAL.

In some embodiments, the method 900 may start 901 and the total deal score 225 of the deal data record 211 of the DEAL may be initialized to zero by the rules engine 321. In step 903, an aggregate variable, referred to as the "observation set", to represent a set of observations 252 for the current state of the DEAL may be initialized to null/empty by the instructional engine 322.

In step 904, the set of rules 241, referred to as "R", may be retrieved from the rules database 240 by the rules engine 321. In step 905, the rules engine 321 may analyze each rule 241, numbered 1 through R, that may be retrieved from the rules database 240 for analysis against the deal data record 211 data and key player record 231 data. In step 907, each rule 241 may be analyzed by the rules engine 321 to determine the number of conditions 243, referred to as "C", required for the rule 241 to be triggered, or put into use. In step 908, an interior loop may be initiated as each condition (examples shown in Table 1), numbered 1 through C, may be may be analyzed by the rules engine 321 using the deal data record 211 data and key player record 231 data to determine if that condition is true or false, in step 909. If the condition is false, further examination of any remaining conditions 243 for the current rule 241 may be abandoned and the next rule 241 may be retrieved by returning to step 905. If the condition is true, then the method 900 may continue to step 910 to determine if the current condition is not yet condition C, the last condition. If so, then the method 900 may continue back to step 908 to retrieve the next condition in the current rule 241. If not, then the rule 241 is triggered and the method 900 may proceed to step 911, where the total deal score 225 may be updated by incrementing it by the rule score 242 of the rule 241. In step 912, the current observations 252 associated with the recommendation 251 of the rule 241 may be added by the instructional engine 322 to the observation set by referencing the instructional database 250. The method 900 may then continue to step 914, where the rules engine 321 may determine if the current rule 241 is not yet rule 241 R, the last rule 241. If so, then the method 900 may continue back to step 905 to retrieve the next rule 241. If not, then in this and some embodiments, the method 900 may end at step 915.

Figure 14:
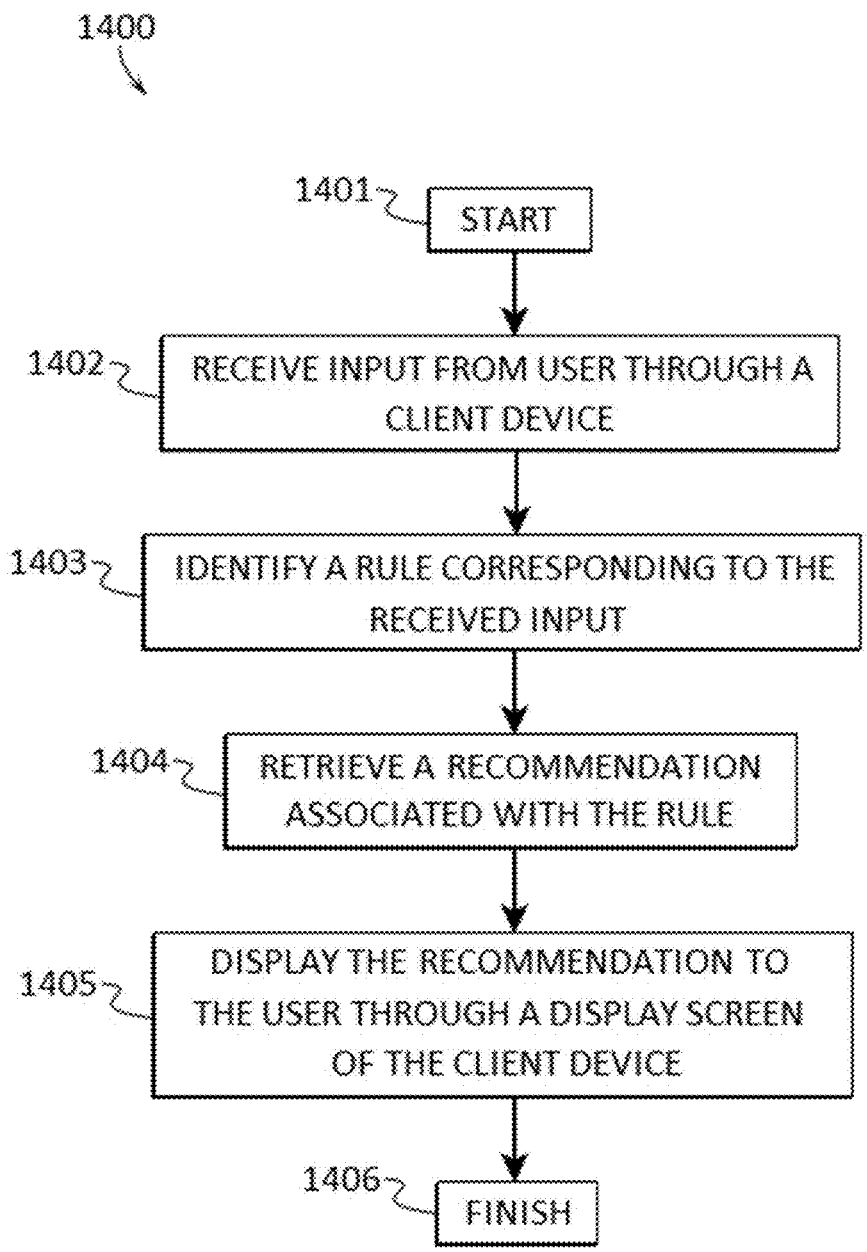
FIG. 14 illustrates a block diagram of a further example of a computer-implemented method for determining and generating an electronic recommendation to a user according to various embodiments described herein.

FIG. 14 illustrates a further example of a computer implemented method for determining and generating an electronic recommendation ("the method") 1400 according to various embodiments described herein. An electronic recommendation may be data and information which may be provided to a user 101 through a display screen 404A or other I/O interface 304, 404, of a server 300 and/or client device 400.

The method 1400 may begin 1401 and input may be received from a user 101 through a client device 400 by the communication application 421 in step 1402. The communication application 421 may store the data in memory, such as a data store 308, 408, of a server 300 and/or client device 400 within a system database 200. In some embodiments, the input received by the communication application 421 may comprise data for populating a key player data record 231. In further embodiments, the input received by the communication application 421 may comprise data for populating a deal data record 211.

In step 1403 one or more rules 241 corresponding to the received input of step 1402 may be identified by the rules engine 321. In some embodiments, one or more rules 241, such as a first rule 241, identified by the rules engine 321 may correspond to data of the key player data record 231. In some embodiments, one or more rules 241, such as a second rule 241, identified by the rules engine 321 may correspond to data of the deal data record 211. The rules engine 321 may identify a rule 241 by matching one or more conditions 243 of the rule 241 to the data in a key player data record 231 and/or deal data record 211 and using the matching data to determine if the conditions 243 of the rule 241 are satisfied.

In step 1404 one or more recommendations 251 associated with the identified rules 241, such as a first recommendation 251 associated with a first rule 241 and a second recommendation 251 associated with a second observation 252, of step 1403 may be retrieved by the instructional engine 322 from the instructional database 250. In some embodiments, each recommendation 251 in the instructional database 250 may have one or more observations 251 associated with it and each recommendation 251 and/or observation 252 be labeled or otherwise identified as a strength or a vulnerability so that one or more strength type observations 252 and/or vulnerability observations 252 may be retrieved by the instructional engine 322.

Next in step 1405, the recommendations 251 retrieved in step 1404, such as a first recommendation 251 and a second recommendation 251, may be displayed to the user 101 through a display screen 404A of the client device 400 by the communication application 421. In further embodiments, the recommendation 251 may be associated with an observation 252 which may also be displayed to the user 101 through a display screen 404A of the client device 400 by the communication application 421. By displaying a recommendation 251 and/or observation 252 on a display screen 404A of the client device 400, the recommendation 251 may be generated as an electronic recommendation and the observation 252 may be generated as an electronic observation.

In some embodiments, the recommendations 251 may be associated with one or more observations 252 in the instructional database 250. For example, a first recommendation 251 may be associated with a first observation 252 and a second recommendation 251 may be associated with a second observation 252. The instructional engine 322 may retrieve the one or more recommendations 251, and the communication application 421 may display the one or more recommendations 251 to the user 101 through a display screen 404A of the client device 400. In further embodiments, a recommendation 251 may comprise a text file and/or a pre-recorded video multimedia file specific for the observation 252, the instructional engine 322 may retrieve the one or more recommendations 251, and the communication application 421 may display the one or more recommendations 251 to the user 101 through a display screen 404A of the client device 400. For example, the first recommendation 251 may comprise a first text file and/or a first pre-recorded video multimedia file specific for the first observation 252, while the second recommendation 251 may comprise a second text file and/or a second pre-recorded video multimedia file specific for the second observation 252.

It will be appreciated that some exemplary embodiments described herein may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the two approaches may be used. Moreover, some exemplary embodiments may be implemented as a computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), a Flash memory, and the like.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

A computer program (also known as a program, software, software application, application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors (computing device processors) executing one or more computer applications or programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, solid state drives, or optical disks. However, a computer need not have such devices.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network or the cloud. The relationship of client and server arises by virtue of computer programs running on the respective computers and having a client server relationship to each other.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

The computer system may also include a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by processor. In addition, the main memory may be used for storing temporary variables or other intermediate information during the execution of instructions by the processor. The computer system may further include a read only memory (ROM) or other static storage device (e.g., programmable ROM (PROM), erasable PROM (EPROM), and electrically erasable PROM (EEPROM)) coupled to the bus for storing static information and instructions for the processor.

The computer system may also include a disk controller coupled to the bus to control one or more storage devices for storing information and instructions, such as a magnetic hard disk, and a removable media drive (e.g., floppy disk drive, read-only compact disc drive, read/write compact disc drive, compact disc jukebox, tape drive, and removable magneto-optical drive). The storage devices may be added to the computer system using an appropriate device interface (e.g., small computer system interface (SCSI), integrated device electronics (IDE), enhanced-IDE (E-IDE), direct memory access (DMA), or ultra-DMA).

The computer system may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system may also include a display controller coupled to the bus to control a display, such as a cathode ray tube (CRT), liquid crystal display (LCD) or any other type of display, for displaying information to a computer user. The computer system may also include input devices, such as a keyboard and a pointing device, for interacting with a computer user and providing information to the processor. Additionally, a touch screen could be employed in conjunction with display. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer system performs a portion or all of the processing steps of the invention in response to the processor executing one or more sequences of one or more instructions contained in a memory, such as the main memory. Such instructions may be read into the main memory from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

As stated above, the computer system includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system, for driving a device or devices for implementing the invention, and for enabling the computer system to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code or software code of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

Various forms of computer readable media may be involved in carrying out one or more sequences of one or more instructions to processor for execution. For example, the instructions may initially be carried on a magnetic disk of a remote computer. The remote computer can load the instructions for implementing all or a portion of the present invention remotely into a dynamic memory and send the instructions over the air (e.g. through a wireless cellular network or wifi network). A modem local to the computer system may receive the data over the air and use an infrared transmitter to convert the data to an infrared signal. An infrared detector coupled to the bus can receive the data carried in the infrared signal and place the data on the bus. The bus carries the data to the main memory, from which the processor retrieves and executes the instructions. The instructions received by the main memory may optionally be stored on storage device either before or after execution by processor.

The computer system also includes a communication interface coupled to the bus. The communication interface provides a two-way data communication coupling to a network link that is connected to, for example, a local area network (LAN), or to another communications network such as the Internet. For example, the communication interface may be a network interface card to attach to any packet switched LAN. As another example, the communication interface may be an asymmetrical digital subscriber line (ADSL) card, an integrated services digital network (ISDN) card or a modem to provide a data communication connection to a corresponding type of communications line. Wireless links may also be implemented. In any such implementation, the communication interface sends and receives electrical, electromagnetic or optical signals that carry digital data streams representing various types of information.

The network link typically provides data communication to the cloud through one or more networks to other data devices. For example, the network link may provide a connection to another computer or remotely located presentation device through a local network (e.g., a LAN) or through equipment operated by a service provider, which provides communication services through a communications network. In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit and receive data, including program code, through the network(s) and, the network link and the communication interface. Moreover, the network link may provide a connection through a LAN to a client device or client device such as a personal digital assistant (PDA), laptop computer, tablet computer, smartphone, or cellular telephone. The LAN communications network and the other communications networks such as cellular wireless and wifi networks may use electrical, electromagnetic or optical signals that carry digital data streams. The processor system can transmit notifications and receive data, including program code, through the network(s), the network link and the communication interface.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A computer implemented method for managing sales within organizations, the method comprising:
    receiving a role of at least one key member in a set of a plurality of key members in a customer's organization in a sales decision process;
    for the set of a plurality of key members, receiving input by a user through a client device, the input comprises data for populating a data record with values within a given range for one or more attributes for each key member in the set of the plurality of key members including:
        an impact score representing an influence of the key member in completing a sales transaction;
        a priority score representing a level of lessor or greater importance being allocated by the key member to the sales transaction;
        an advocacy score representing an amount of support by the key member for completion of the sale transaction; and
        an access score representing an amount of contact, with the key member;
    for a given key member in the set of the plurality of key members, retrieving a set of at least one rule each with a set of at least one or more conditions per given rule, and for a given rule in the set of at least one rule performing:
        for a given condition in the set of at least one or more conditions performing:
            identifying whether the given condition in the set of at least one or more conditions per given rule in the set of at least one rule applies to the one or more attributes for the given key member in the set of the plurality of key members; and
            in response to the given condition applying to the given key member for the given rule in the set of at least one rule, adding a given condition score to a given rule score;
        adding the given condition score for each given rule score to a total deal score;
    retrieving a set of one or more recommendations based on the total deal score; and
    automatically displaying to the user, via a display screen of the client device, the set of one or more recommendations as positions in a graph, for at least one key member in the set of the plurality of key members in one or more of
        a deal legitimacy graph with one axis representing the impact score and another representing the priority score, wherein a deal legitimacy position on the deal legitimacy graph for at least one key member in the set of the plurality of key members are based on the impact score and the priority score, and the deal legitimacy position is relative to a first linear function with y-intercept of zero, and
        a deal position graph with one axis representing the advocacy score and another axis representing the access score, wherein a deal position on the deal position graph for at least one key member in the set of the plurality of key members are based on the advocacy score and the access score, and the deal position is relative to a second linear function with y-intercept of zero.

2. The method of claim 1, wherein the set of one or more recommendations is associated with an observation.

3. The method of claim 2, wherein the observation is selected from the group consisting of a strength and a vulnerability.

4. The method of claim 3, wherein the set of one or more recommendations comprises a pre-recorded video multimedia file specific for the observation.

5. The method of claim 1, further comprising:
    determining a legitimacy value corresponding to a legitimacy of a deal, wherein the data used to determine the legitimacy value comprises the impact score of each key player and the priority score of each key player.

6. The method of claim 1, further comprising:
    determining a position value corresponding to a position of a deal, wherein the data used to determine the position value comprises the advocacy score of each key player and the access score of each key player.

7. The method of claim 1, further comprising:
    determining a legitimacy value corresponding to a legitimacy of a deal, wherein the data used to determine the legitimacy value comprises the impact score of each key player, the role data of each key player, and the priority score of each key player, and
    determining a position value corresponding to the position of a deal, wherein the data used to determine the position value comprises an advocacy score of each key player, a role data of each key player, and an access score of each key player.

8. The method of claim 1, further comprising determining a total deal score, wherein one or more rule scores are used to determine the total deal score.

9. The method of claim 7, wherein the total deal score is calculated from a combination of a close date confidence score, a deal value confidence score, a rule score, and a sales stage confidence score.

10. The method of claim 1, whereby a non-numeric value of the role is converted to the given numeric range prior to adding the given condition score to the given rule score.

11. A computer implemented system for managing sales within a plurality of organizations, the system comprising:

a computing platform having a hardware processor, a memory in communication with the processor, the hardware processor performing receiving a role of at least one key member in a set of a plurality of key members in a customer's organization in a sales decision process;

for the set of a plurality of key members, receiving input by a user through a client device, the input comprises data for populating a data record with values within a given range for one or more attributes for each key member in the set of the plurality of key members including:

an impact score representing an influence of the key member in completing a sales transaction;

a priority score representing a level of lessor or greater importance being allocated by the key member to the sales transaction;

an advocacy score representing an amount of support by the key member for completion of the sale transaction; and an access score representing an amount of contact, with the key member;

for a given key member in the set of the plurality of key members, retrieving a set of at least one rule each with a set of at least one or more condition per given rule, and for a given rule in the set of at least one rule performing:

for a given condition in the set of at least one or more conditions performing:

identifying whether the given condition in the set of at least one or more conditions per given rule in the set of at least one rule applies to the one or more attributes for the given key member in the set of the plurality of key members; and in response to the given condition applying to the given key member for the given rule in the set of at least one rule, adding a given condition score to a given rule score;

adding the given condition score for each given rule score to a total deal score;

retrieving a set of one or more recommendations based on the total deal score; and automatically displaying to the user, via a display screen of the client device, the set of one or more recommendations as positions in a graph, for at least one key member in the set of the plurality of key members in one or more of a deal legitimacy graph with one axis representing the impact score and another representing the priority score, wherein a deal legitimacy position on the deal legitimacy graph for at least one key member in the set of the plurality of key members are based on the impact score and the priority score, and the deal legitimacy position is relative to a first linear function with y-intercept of zero, and a deal position graph with one axis representing the advocacy score and another axis representing the access score, wherein a deal position on the deal position graph for at least one key member in the set of the plurality of key members are based on the advocacy score and the access score, and the deal position is relative to a second linear function with y-intercept of zero.

12. The system of claim 11, wherein the set of one or more recommendations is associated with an observation.

13. The system of claim 12, wherein the observation is selected from the group consisting of a strength and a vulnerability.

14. The system of claim 13, wherein the set of one or more recommendations comprises a pre-recorded video multimedia files specific for the observation.

15. The system of claim 11, further comprising:
determining a legitimacy value corresponding to a legitimacy of a deal, wherein the data used to determine the legitimacy value comprises the impact score of each key player and the priority score of each key player.

16. The system of claim 11, further comprising:
determining a position value corresponding to the position of a deal, wherein the data used to determine the position value comprises the advocacy score of each key player and the access score of each key player.

17. The system of claim 11, further comprising:
determining a legitimacy value corresponding to a legitimacy of a deal, wherein the data used to determine the legitimacy value comprises the impact score of each key player, the role data of each key player, and the priority score of each key player, and
determining a position value corresponding to the position of a deal, wherein the data used to determine the position value comprises the advocacy score of each key player, the role data of each key player, and the access score of each key player.

18. The system of claim 11, further comprising determining a total deal score, wherein one or more rule scores are used to determine the total deal score.

19. The system of claim 17, wherein the total deal score is calculated from a combination of a close date confidence score, a deal value confidence score, a rule score, and a sales stage confidence score.

20. The system of claim 9, whereby a non-numeric value of the role is converted to the given numeric range prior to adding the given condition score to the given rule score.

* * * * *